(12) United States Patent
Avis et al.

(10) Patent No.: US 11,904,305 B2
(45) Date of Patent: Feb. 20, 2024

(54) CATALYTIC COMPOSITION FOR TREATING A NOX-CONTAINING EXHAUST GAS

(71) Applicant: Johnson Matthey Public Limited Company, London (GB)

(72) Inventors: Daniel Avis, Royston (GB); Alexander Nicholas Michael Green, Royston (GB); Matthew Eben Harris, Royston (GB); Carmelo Iacono, Royston (GB); Caitlin Jenkins, Royston (GB); Alanna Murphy, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/662,377

(22) Filed: May 6, 2022

(65) Prior Publication Data

US 2022/0362754 A1 Nov. 17, 2022

Related U.S. Application Data

(60) Provisional application No. 63/201,773, filed on May 12, 2021.

(51) Int. Cl.
   *F01N 3/28* (2006.01)
   *B01J 29/78* (2006.01)
   *B01D 53/94* (2006.01)

(52) U.S. Cl.
   CPC ........ *B01J 29/783* (2013.01); *B01D 53/9418* (2013.01); *F01N 3/2803* (2013.01); *B01D 2255/2065* (2013.01); *B01D 2255/2073* (2013.01); *B01D 2255/20761* (2013.01); *B01D 2255/50* (2013.01); *F01N 2370/04* (2013.01)

(58) Field of Classification Search
   None
   See application file for complete search history.

(56) References Cited

U.S. PATENT DOCUMENTS

| | | | |
|---|---|---|---|
| 8,535,629 B2 | 9/2013 | Ballinger | |
| 8,906,329 B2 | 12/2014 | Ballinger | |
| 2012/0214663 A1* | 8/2012 | Chigapov | ............ B01J 29/072 502/73 |
| 2014/0328738 A1 | 11/2014 | Chandler et al. | |

FOREIGN PATENT DOCUMENTS

| | | |
|---|---|---|
| WO | 2012075400 | 12/2011 |
| WO | 2013079954 A1 | 6/2013 |
| WO | 2020047356 A1 | 3/2020 |

OTHER PUBLICATIONS

Jiang et al., "The Influence of Ce or Mn Doping on Cu-Based Catalysts for De-NOx with NH3-SCR", Journal of Chemistry, vol. 2020, Artile ID 1462801, pp. 1-8 2020.

Liu Qingling et al., "MnOx-Ce02 supported on Cu-SSZ-13: A novel SCR catalyst in a wide temperature range" Applied Catalysis A: General, vol. 547, pp. 146-154, Aug. 2017.

* cited by examiner

*Primary Examiner* — Sheng H Davis

(57) ABSTRACT

A catalytic composition for treating a NOx-containing exhaust gas, wherein the composition comprises a copper-substituted zeolite comprising: i) Ce in a total amount of about 0.1 to about 200 g/ft³; and ii) Mn in a total amount of about 0.1 to about 200 g/ft³.

11 Claims, 5 Drawing Sheets

CATALYTIC COMPOSITION FOR TREATING A NOX-CONTAINING EXHAUST GAS

BACKGROUND OF THE INVENTION

The present invention relates to a catalytic composition and, in particular, to a composition for treating a NOx-containing exhaust gas. The composition gives good NOx conversion with improved $N_2O$ selectivity.

$NH_3$—SCR is the most effective technique for NOx abatement in lean-burning engine exhaust after-treatment. In this regard, copper zeolites have been commercialized as $NH_3$—SCR catalysts for their significant advantages of excellent catalytic performance and hydrothermal stability. However, with more and more stringent restrictions imposed on emissions from engine exhausts, especially for vehicles under cold start conditions, further enhancing the low-temperature $NH_3$—SCR activity and $N_2O$ selectivity is highly desirable.

Accordingly, it is desirable to provide an improved catalytic composition for treating a NOx-containing exhaust gas and/or to tackle at least some of the problems associated with the prior art or, at least, to provide a commercially viable alternative thereto.

SUMMARY OF THE INVENTION

According to some aspects of the present invention, a catalytic composition for treating a NOx-containing exhaust gas, wherein the composition comprises a copper-substituted zeolite includes: i) Ce in a total amount of about 0.1 to about 200 $g/ft^3$; and ii) Mn in a total amount of about 0.1 to about 200 $g/ft^3$. In some aspects, Mn is present in an amount of about 10 to about 70 $g/ft^3$. In some aspects, Ce is present in an amount of about 80 to about 140 $g/ft^3$.

In some aspects, the copper may be present in an amount of from about 1 to about 6 wt % of the catalytic composition; about 3 to about 5.5 wt % of the catalytic composition; or about 3.2 to about 4.8 wt % of the catalytic composition.

In some aspects, the copper-substituted zeolite is a small-pore zeolite, for example, a small-pore zeolite having a CHA and/or AEI framework structure type.

In particular aspects, the catalytic composition includes: copper in an amount of from about 1 to about 6 wt % of the catalytic composition; Mn in an amount of about 10 to about 70 $g/ft^3$; and Ce in an amount of about 80 to about 140 $g/ft^3$.

DETAILED DESCRIPTION OF THE INVENTION

Figure 1:
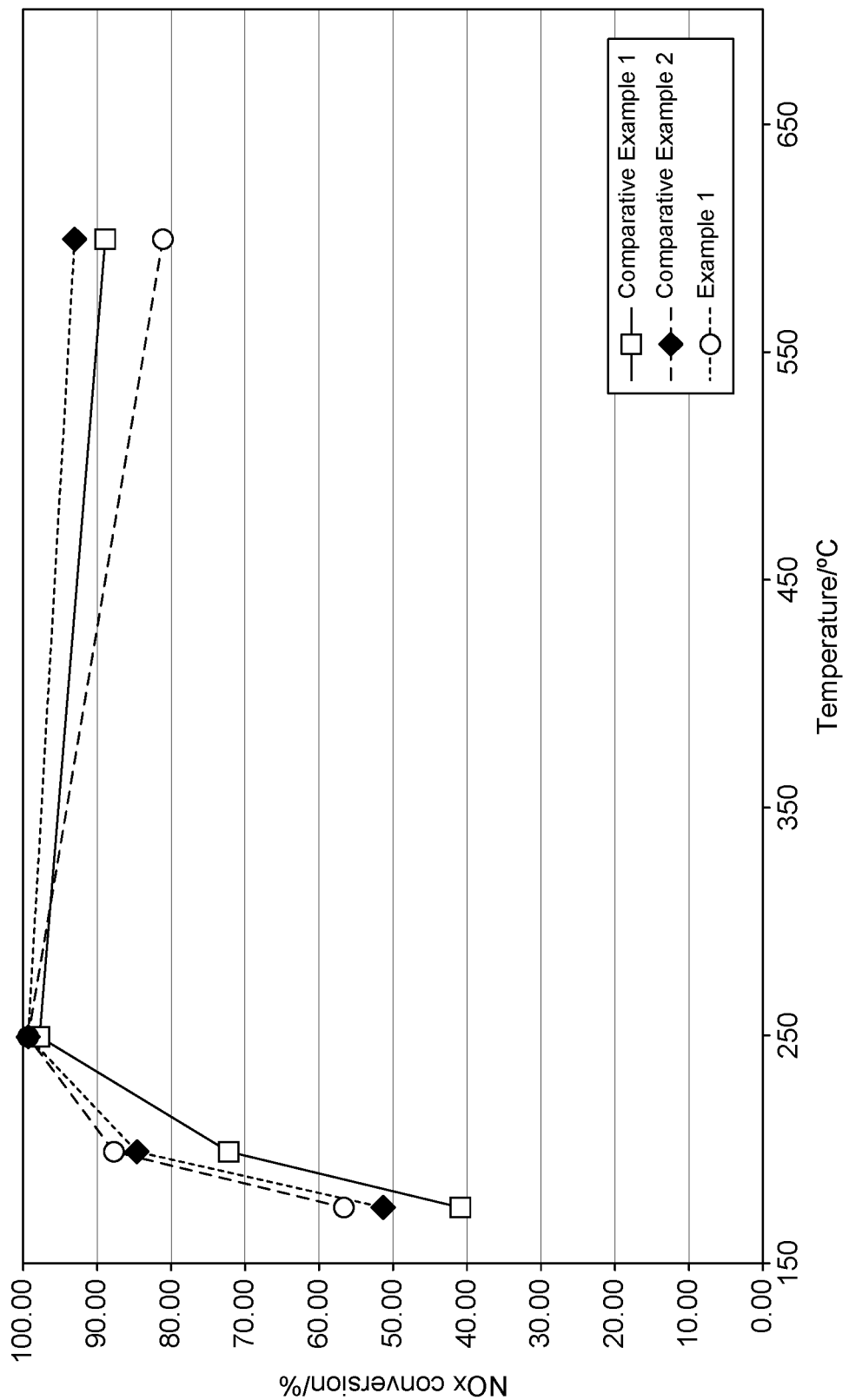
FIG. 1 is a graph demonstrating the NOx conversion activity of the catalysts of Comparative Examples 1 and 2 and Example 1 aged at 800° C. for 16 hours.

Compositions, methods, and systems of the present invention relate to a catalytic composition for treating a NOx-containing exhaust gas, wherein the composition comprises a copper-substituted zeolite comprising:
i) Ce in a total amount of about 0.1 to about 200 $g/ft^3$; and
ii) Mn in a total amount of about 0.1 to about 200 $g/ft^3$.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Catalytic Composition

The catalytic composition comprises a copper-substituted zeolite comprising: i) Ce in an amount of about 0.1 to about 200 $g/ft^3$; and ii) Mn in a total amount of about 0.1 to about 200 $g/ft^3$. In some aspects, the copper-substituted zeolite consists essentially of: the copper-substituted zeolite and i) Ce in an amount of about 0.1 to about 200 $g/ft^3$; and ii) Mn in a total amount of about 0.1 to about 200 $g/ft^3$. In some aspects, the copper-substituted zeolite consists of: the copper-substituted zeolite and i) Ce in an amount of about 0.1 to about 200 $g/ft^3$; and ii) Mn in a total amount of about 0.1 to about 200 $g/ft^3$. In some aspects, the copper-substituted zeolite comprises further metals in addition to Cu, Ce, and Mn.

Zeolites

Zeolites are structures formed from alumina and silica and the silica-to-alumina molar ratio ("SAR") determines the reactive sites within the zeolite structure.

In some aspects, a suitable zeolite has a silica to alumina molar ratio (SAR) of from 5 to 200 (e.g. 10 to 200); 10 to 100 (e.g. 10 to 30 or 20 to 80); 10 to 50; 10 to 30; 12 to 40; 15 to 30; 5 to 20; 5 to 15; 8 to 15; 8 to 13; 10 to 15; 10 to 20; 10 to 40; 10 to 60; 10 to 80; 10 to 100; 10 to 150; <30; <20; <15; or <13. In some aspects, a suitable molecular sieve has a SAR of >200; >600; or >1200. In some aspects, the molecular sieve has a SAR of from about 1500 to about 2100.

In some aspects, the zeolite is a small-pore zeolite. Small-pore zeolites possess pores that are constructed of eight tetrahedral atoms ($Si^{4+}$ and $Al^{3+}$), each time linked by a shared oxygen. These eight-member ring pores provide small molecules access to the intracrystalline void space, e.g., to NOx during car exhaust cleaning (NOx removal) or to methanol en route to its conversion into light olefins, while restricting larger molecule entrance and departure that is critical to overall catalyst performance. While a small pore zeolite is a material comprising pore openings having 8 tetrahedral atoms in a ring, a medium pore zeolite is one where the smallest pores have 10 tetrahedral atoms in a ring and a large pore zeolite is one where the smallest pores have 12 tetrahedral atoms in a ring.

In some aspects, the small-pore zeolite has a framework structure selected from the group consisting of AEI, AFT, AFV, AFX, AVL, CHA, EMT, GME, KFI, LEV, LTN, and SFW, including mixtures or intergrowths of two or more thereof. In particular aspects, the zeolite has a CHA and/or AEI-type framework structure.

In some aspects, the small-pore zeolite has a silica to alumina molar ratio (SAR) of less than about 30, about 5 to about 30, or about 10 to about 30.

When the zeolite is a medium pore zeolite, then the medium pore zeolite may have a framework structure selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI and WEN, or a mixture and/or an intergrowth of two or more thereof. In some aspects, the medium pore zeolite has a framework structure selected from the group consisting of FER, MEL, MFI, and STT.

When the zeolite is a large pore zeolite, then the large pore zeolite may have a framework structure selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. In some aspects, the large pore zeolite has a framework structure selected from the group consisting of AFI, BEA, MAZ, MOR, and OFF.

Copper

Zeolites of the present invention are copper-substituted. Copper may be incorporated through known techniques, such as ion-exchange. The copper may be present in the copper-substituted zeolite in an amount of from about 1 to about 6 wt %, about 3 to about 5.5 wt %, or about 3.2 to about 4.8 wt %. The reference to wt % is the weight of copper relative to the total weight of the copper-substituted zeolite.

Cerium

Copper-substituted zeolites of the present invention include cerium. The catalytic composition comprises Ce in a total amount of about 0.1 to about 200 $g/ft^3$. In some aspects, the catalytic composition includes Ce in a total amount of about 80 to about 140 $g/ft^3$, or about 90 to about 130 $g/ft^3$.

Manganese

Copper-substituted zeolites of the present invention include manganese. The catalytic composition comprises Mn in a total amount of about 0.1 to about 200 $g/ft^3$. In some aspects, the catalytic composition includes Mn in a total amount of about 10 to about 70 $g/ft^3$, or about 10 to about 40 $g/ft^3$.

Weight Ratios of Ce/Mn

In some aspects, a copper-substituted zeolite includes cerium and manganese in a weight ratio of about 1:1. In some aspects, a copper-substituted zeolite includes cerium and manganese in a weight ratio of about 0.1 to about 50; about 0.2 to about 15; or about 0.33 to about 3.

Catalysts of the present invention can be prepared by any suitable means known in the art, including, for example, one pot, prefixing, and spray drying.

Catalyst Article

According to a further aspect there is provided a catalyst article for an exhaust gas system, the catalyst article comprising the catalytic composition as described herein. Techniques for forming such catalyst articles comprising catalytic compositions are well known in the art.

A catalyst article of the present invention may include a substrate and a catalytic composition. The substrate may be a flow-through substrate or a filtering substrate. The substrate may comprise the catalytic composition (i.e. the catalyst article is obtained by extrusion) or the catalytic composition may be disposed or supported on the substrate (i.e. the catalytic composition is applied onto the substrate by a washcoating method). The catalytic composition may coat the substrate entirely or partially, as desired. In some aspects, a catalyst article includes a Cu/Mn/Ce zeolite extruded article which is coated with one or more additional catalysts. In some aspects, the extruded catalyst is coated with one or more additional SCR catalysts, which could include, for example, a Cu/Mn/Ce zeolite.

In some aspects, the catalyst article may comprise the catalytic composition in a total concentration of about 0.5 to about 4.0 g in 3; about 1.0 to about 3.0 g in 3; or about 1.2 to about 2.5 g/in3.

When the catalyst article has a filtering substrate, then it is a selective catalytic reduction filter catalyst. The selective catalytic reduction filter comprises a filtering substrate and the catalyst composition. References to use of SCR catalysts throughout this application are understood to include use of selective catalytic reduction filter catalysts as well, where applicable.

The flow-through or filter substrate is a substrate that is capable of containing catalyst/adsorber components. The substrate is preferably a ceramic substrate or a metallic substrate. The ceramic substrate may include any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalytic composition may be added to the flow-through or filter substrate by any known means, such as a washcoat procedure.

When the catalyst article is selective catalytic reduction filter, then the filtering substrate may preferably be a wall flow filter substrate monolith. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%. The uncoated wall flow filter substrate monolith typically has a mean pore size of at least 5 μm. It is preferred that the mean pore size is from 10 to 40 μm, such as 15 to 35 μm, more preferably 20 to 30 μm.

The wall flow filter substrate may have a symmetric cell design or an asymmetric cell design.

In general for a selective catalytic reduction filter, the catalyst composition is disposed within the wall of the wall-flow filter substrate monolith. Additionally, the catalytic composition may be disposed on the walls of the inlet channels and/or on the walls of the outlet channels.

Catalytic compositions of aspects of the present invention may be coated on a suitable monolith substrate. Washcoat compositions containing the catalytic compositions of the present invention for coating onto the monolith substrate or for manufacturing extruded type substrate monoliths can comprise a binder selected from the group consisting of alumina, silica, (non zeolite) silica-alumina, naturally occurring clays, $TiO_2$, $ZrO_2$, and $SnO_2$. In general, catalyst articles comprising the catalytic composition in a desired loading level may be prepared by washcoating, extrusion, or other methods known in the art.

Exhaust Gas System and Methods

According to a further aspect there is provided an exhaust gas system comprising the catalyst article described herein and a combustion engine, preferably a diesel engine. The catalyst article is arranged downstream of the engine to treat the exhaust gas emitted therefrom.

Methods of the present invention relate to treating exhaust gas containing nitrogen oxides, by contacting the exhaust gas with a reductant, such as a nitrogenous reductant or hydrocarbon reductant, in the presence of a catalyst composition as described herein. As such, catalytic compositions of the present invention may function as selective catalytic reduction catalysts.

In some aspects, the nitrogen oxides are reduced with the reducing agent at a temperature of at least 100° C. In some aspects, the catalysts as described herein are effective at reducing nitrogen oxides with the reducing agent over a wide temperature range (e.g., from about 150° C. to 750° C.) in addition to being hydrothermally stable at temperatures above 900° C. The latter characteristics may be particularly useful for treating exhaust gases from heavy and light duty diesel engines, particularly engines comprising exhaust systems comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

In a particular aspect, the catalysts as described herein are effective at reducing nitrogen oxides with the reducing agent in a temperature range of from 175 to 550° C. In another aspect, the temperature range is from 175 to 400° C. In some aspects, the temperature range is from 275 to 500° C., or 250 to 550° C. When $N_2O$ is present in the gas stream, the temperature range may be wider, such as 150 to 650° C.; 175 to 625° C.; 200 to 600° C.; or 225 to 575° C.

Benefits of the Invention

It has surprisingly been discovered that catalytic compositions of the present invention provide unexpected benefits, as follows:

The presence of Ce in a catalytic composition gives $NO_x$ conversion improvement for aged catalysts. The addition of Mn does not compromise, and at some loadings actually improves, the NOx conversion performance.

The addition of Mn also leads to improved $N_2O$ selectivity at both low and high temperatures for aged catalysts.

The combination of cerium and manganese synergistically improves the low temperature NOx activity.

The addition of cerium in addition to manganese does not significantly compromise the reduced $N_2O$ selectivity achieved when by the presence of manganese.

The addition of manganese does not compromise the improved transient response achieved by the presence of cerium but also leads to improved $NH_3$ storage.

The addition of manganese does not compromise the improved low temperature NOx activity achieved by the presence of cerium but actually improves the high temperature NOx activity.

The addition of cerium also does not significantly compromise the reduced $N_2O$ selectivity at high temperatures achieved by the presence of manganese.

Although preferred embodiments of the invention have been described herein in detail, it will be understood by those skilled in the art that variations may be made thereto without departing from the scope of the invention or of the appended claims.

The invention will now be described further in relation to the following non-limiting examples and figures.

EXAMPLES

TABLE 1

| Example | Composition |
| --- | --- |
| Comparative Example 1 | Copper-substituted small pore zeolite comprising 3.2 wt % Cu and 40 g/ft³ (1.1 wt %) Mn |
| Comparative Example 2 | Copper-substituted small pore zeolite comprising 3.25 wt % Cu and 125 g/ft³ Ce |
| Comparative Example 3 | Copper-substituted small pore zeolite comprising 4.75 wt % Cu and 153 g/ft³ (4.3 wt %) Ce |
| Comparative Example 4 | Copper-substituted small pore zeolite comprising 4.75 wt % Cu and 18 g/ft³ (0.5 wt %) Mn |
| Comparative Example 5 | Copper-substituted small pore zeolite comprising 4.0 wt % Cu and 18 g/ft³ (0.5 wt %) Mn |
| Example 1 | Copper-substituted small pore zeolite comprising 3.2 wt % Cu, 40 g/ft³ (1.1 wt %) Mn and 100 g/ft³ Ce |
| Example 2 | Copper-substituted small pore zeolite comprising 4.0 wt % Cu, 18 g/ft³ (0.5 wt %) Mn and 125 g/ft³ Ce |

The NOx activity and $N_2O$ selectivity of catalysts of comparative examples 1 to 5 and examples 1 and 2 set out in Table 1 were tested using a gas flow comprising 500 ppm NO, 750 ppm $NH_3$, 350 ppm CO, 8% $CO_2$, 10% $O_2$, 5% $H_2O$, balance $N_2$. The results of the tests are shown in FIGS. 1 to 5.

FIG. 1 is a graph demonstrating the NOx conversion activity of the catalysts of Comparative Examples 1 and 2 and Example 1 aged at 800° C. for 16 hours.

Figure 2:
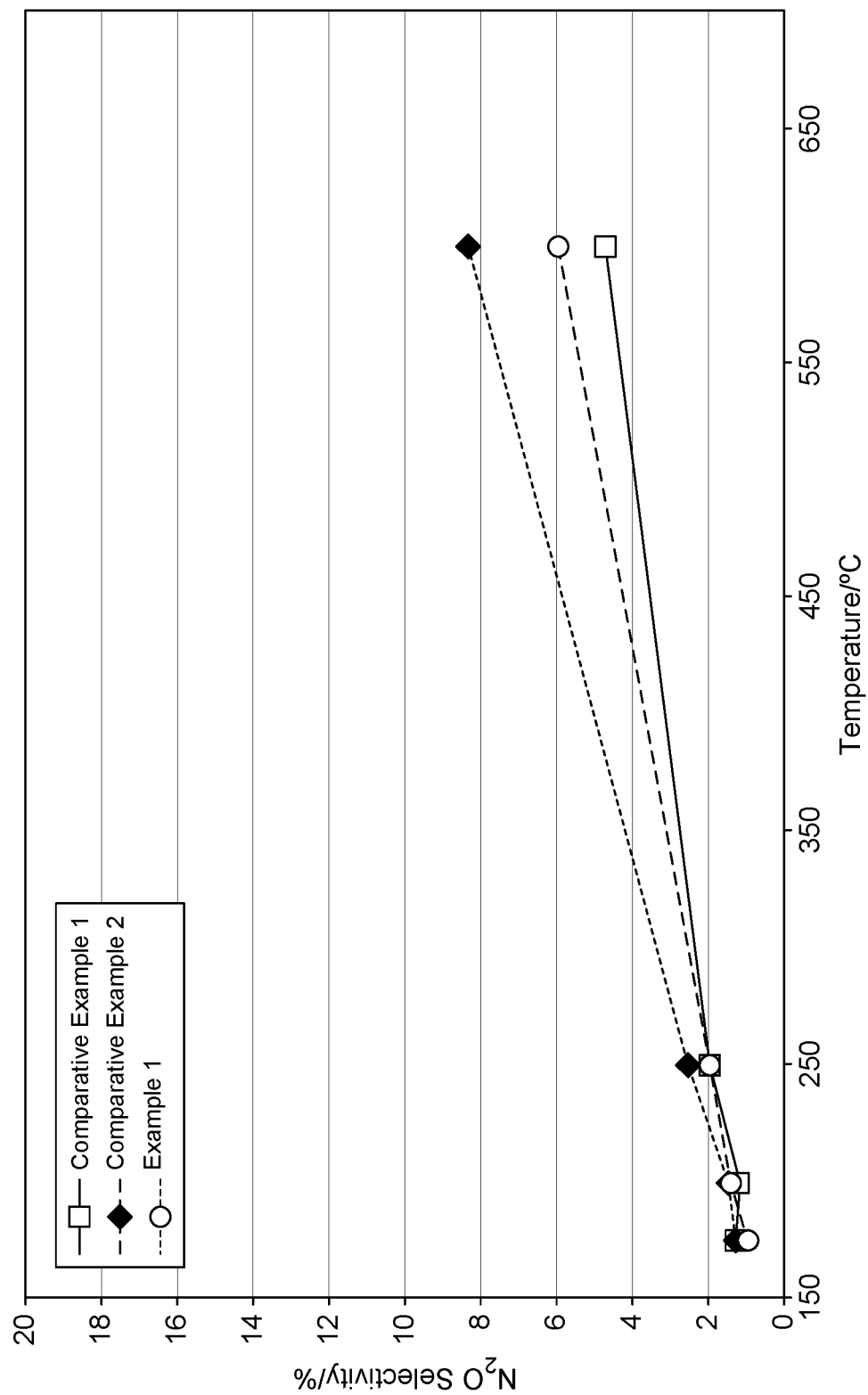
FIG. 2 is a graph demonstrating $N_2O$ selectivity of the catalysts of Comparative Examples 1 and 2 and Example 1 aged at 800° C. for 16 hours.

FIG. 2 is a graph demonstrating $N_2O$ selectivity of the catalysts of Comparative Examples 1 and 2 and Example 1 aged at 800° C. for 16 hours.

Figure 3:
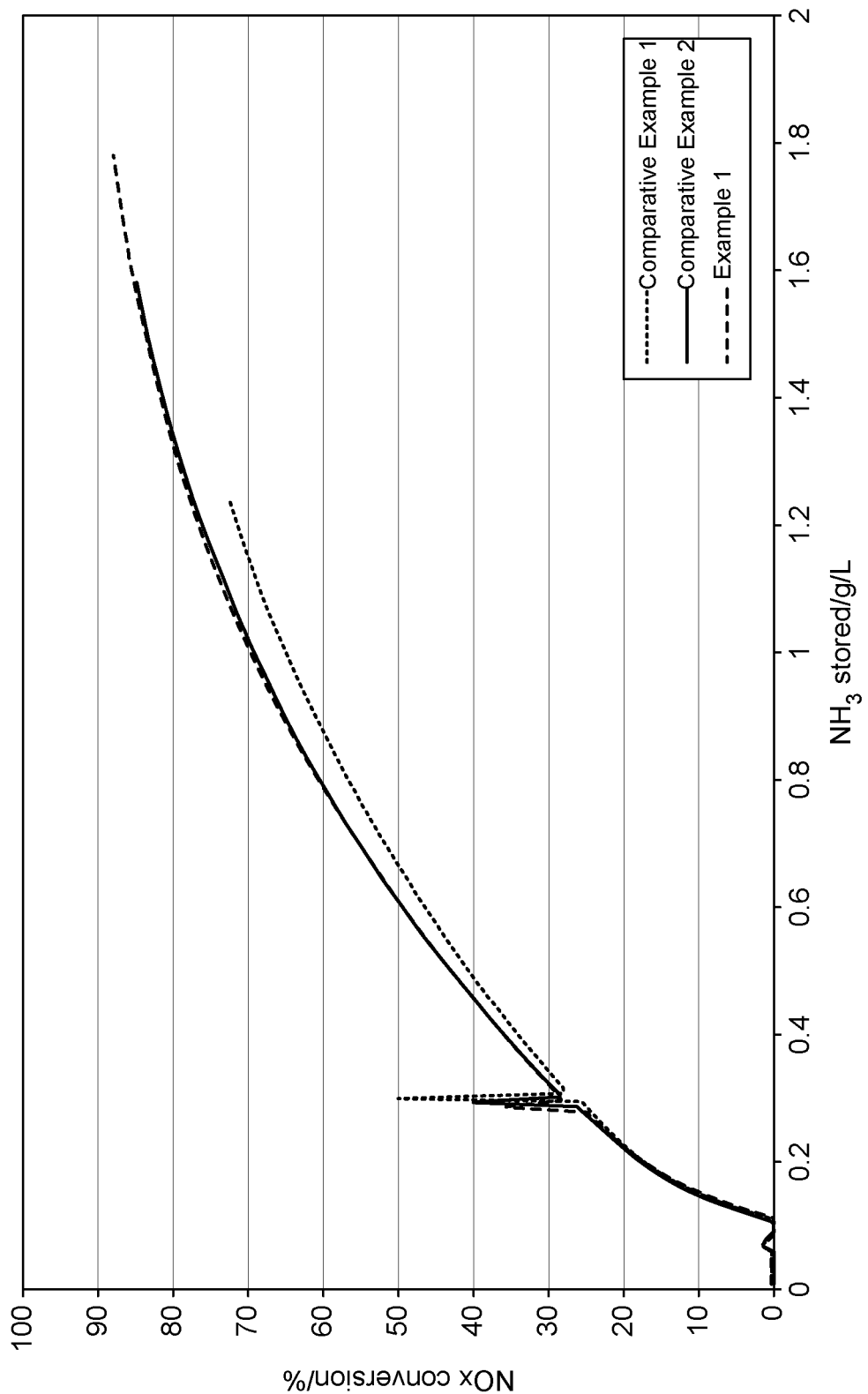
FIG. 3 is a graph demonstrating the transient response for NOx conversion at 200° C. of the catalysts of Comparative Examples 1 and 2 and Example 1 aged at 800° C. for 16 hours.

FIG. 3 is a graph demonstrating the transient response for NOx conversion at 200° C. of the catalysts of Comparative Examples 1 and 2 and Example 1 aged at 800° C. for 16 hours.

Figure 4:
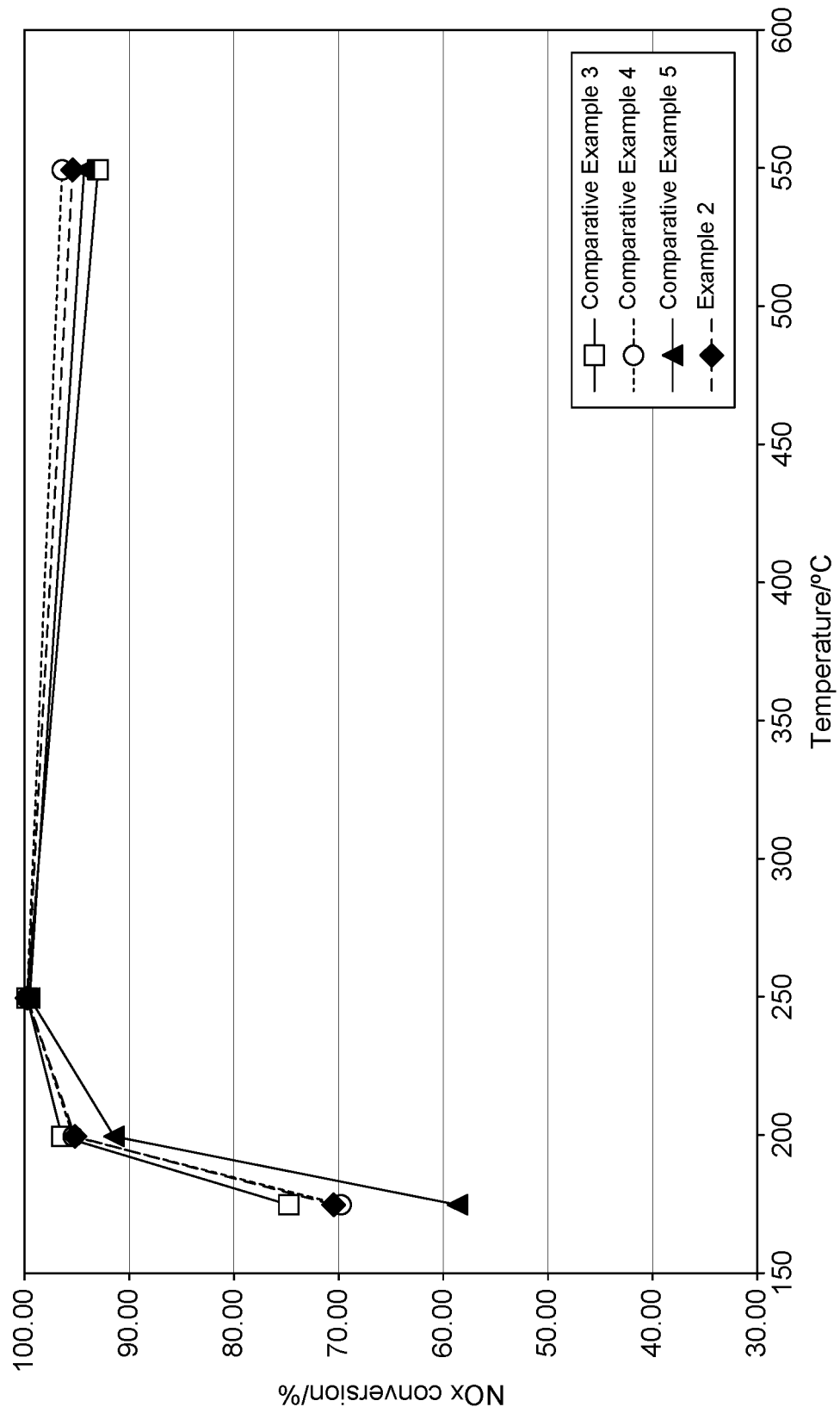
FIG. 4 is a graph demonstrating the NOx conversion activity of the catalysts of Comparative Examples 3, 4 and 5 and Example 2 aged at 650° C. for 50 hours.

FIG. 4 is a graph demonstrating the NOx conversion activity of the catalysts of Comparative Examples 3, 4 and 5 and Example 2 aged at 650° C. for 50 hours.

Figure 5:
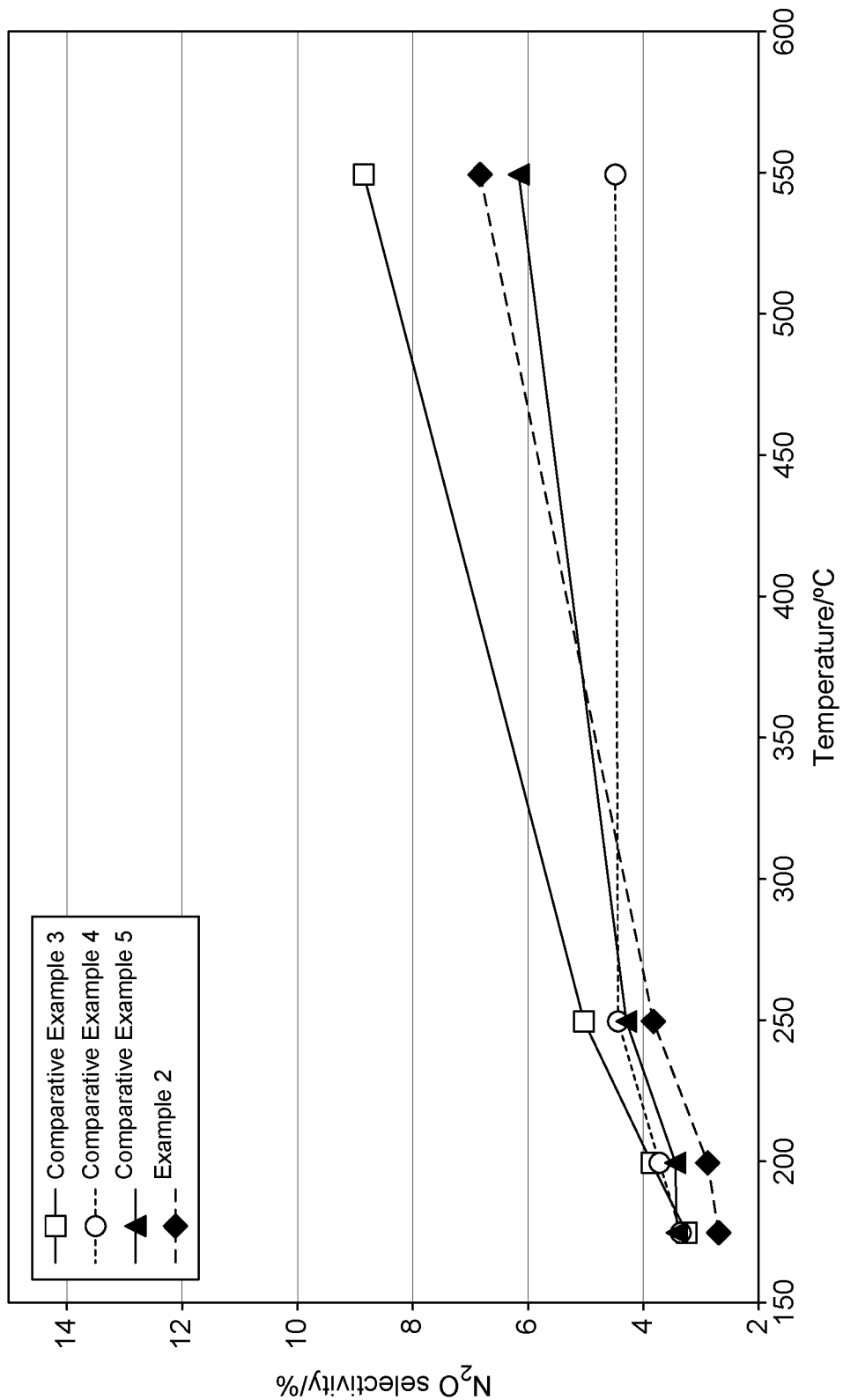
FIG. 5 is a graph demonstrating $N_2O$ selectivity of the catalysts of Comparative Examples 3, 4 and 5 and Example 2 aged at 650° C. for 50 hours.

FIG. 5 is a graph demonstrating $N_2O$ selectivity of the catalysts of Comparative Examples 3, 4 and 5 and Example 2 aged at 650° C. for 50 hours.

FIG. 1 includes data for NOx conversion activity of the catalysts of Comparative Examples 1 and 2 and Example 1 aged at 800° C. for 16 hours. FIG. 1 demonstrates the effect of substituting the copper zeolite with both manganese and cerium on NOx activity compared to cerium or manganese alone. As shown in FIG. 1, the combination of manganese and cerium leads to improved aged NOx activity at low temperatures compared to both the copper zeolite substituted with only manganese and the copper zeolite substituted with only cerium. Therefore, the combination of cerium and manganese synergistically improves the low temperature NOx activity.

FIG. 2 includes data for $N_2O$ selectivity for the catalysts of Comparative Examples 1 and 2 and Example 1 aged at 800° C. for 16 hours. FIG. 2 demonstrates the effect of substituting the copper zeolite with both manganese and cerium on $N_2O$ selectivity compared to cerium or manganese alone. As shown in FIG. 2, the combination of manganese and cerium (Example 1) leads to improved $N_2O$ selectivity at both low and high temperatures compared to a copper zeolite substituted with cerium alone and comparable $N_2O$ selectivity to compared to a copper zeolite substituted with manganese alone. Therefore, the addition of cerium in addition to manganese does not significantly compromise the reduced $N_2O$ selectivity achieved when by the presence of manganese.

FIG. 3 includes data for the transient response for NOx conversion at 200° C. for the catalysts of Comparative Examples 1 and 2 and Example 1 aged at 800° C. for 16 hours. FIG. 3 demonstrates the effect on the transient response for NOx conversion of substituting the copper zeolite with both manganese and cerium on NOx activity compared to cerium or manganese alone. As shown in FIG. 3, the combination of manganese and cerium (Example 1) leads to an improved transient response for NOx activity compared to a copper zeolite substituted with manganese alone and improved $NH_3$ storage compared to a copper zeolite substituted with cerium alone. Indeed, the addition of manganese does not compromise the improved transient response achieved by the presence of cerium but also leads to improved $NH_3$ storage.

FIG. 4 includes data for NOx conversion activity of the catalysts of Comparative Examples 3, 4 and 5 and Example 2 aged at 650° C. for 50 hours. FIG. 4 demonstrates the effect of substituting the copper zeolite with both manganese and cerium on NOx activity compared to cerium or manganese alone. As shown in FIG. 4, the combination of Manganese and Cerium (Example 1) leads to improved NOx activity at low temperatures compared to CuMn. FIG. 4, in contrast to FIG. 1, also demonstrates improved NOx activity for the combination of manganese and cerium at high temperatures compared to a copper zeolite substituted with cerium alone and comparable high temperature NOx activity compared to a copper zeolite substituted with manganese alone.

Therefore, the addition of manganese does not compromise the improved low temperature NOx activity achieved by the presence of cerium but actually improves the high temperature NOx activity.

FIG. 5 includes data for $N_2O$ selectivity for the catalysts of Comparative Examples 3, 4 and 5 and Example 2 aged at 650° C. for 50 hours. FIG. 5 demonstrates the effect on $N_2O$ of substituting the copper zeolite with both manganese and cerium on $N_2O$ selectivity compared to cerium or manganese alone. As shown in FIG. 5, the combination of manganese and cerium synergistically achieves lower $N_2O$ selectivity at low temperatures compared to the copper zeolite substituted with manganese alone (for both Comparative Examples 4 and 5) and the copper zeolite substituted with cerium. The addition of cerium also does not significantly compromise the reduced $N_2O$ selectivity at high temperatures achieved by the presence of manganese.

Therefore, the combination of manganese and cerium synergistically improves $N_2O$ selectivity and NOx activity of aged catalysts, especially at low temperatures.

Although the term "comprising" has been used to describe the composition of the catalyst to allow for the presence of other components, it will be appreciated that certain aspects of the invention include the composition consisting substantially of those components described herein, that is it contains less than 5 wt % other components, less than 1% other components, or no other components.

All references to wt % herein are relative to the total weight of the copper-substituted small-pore zeolite unless otherwise indicated.

The invention claimed is:

1. A catalytic composition for treating a NOx-containing exhaust gas, wherein the composition comprises a copper-substituted zeolite comprising:
   i) Ce in a total amount of about 0.1 to about 200 $g/ft^3$; and
   ii) Mn in a total amount of about 0.1 to about 200 $g/ft^3$.

2. The catalytic composition of claim 1, wherein the copper is present in an amount of from about 1 to about 6 wt % of the catalytic composition.

3. The catalytic composition of claim 1, wherein the copper is present in an amount of about 3 to about 5.5 wt % of the catalytic composition.

4. The catalytic composition of claim 1, wherein the copper is present in an amount of about 3.2 to about 4.8 wt % of the catalytic composition.

5. The catalytic composition of claim 1, wherein the copper-substituted zeolite is a small-pore zeolite.

6. The catalytic composition of claim 5, wherein the small-pore zeolite has a CHA and/or AEI framework structure type.

7. The catalytic composition of claim 1, wherein Mn is present in an amount of about 10 to about 70 $g/ft^3$.

8. The catalytic composition of claim 1, wherein Ce is present in an amount of about 80 to about 140 $g/ft^3$.

9. The catalytic composition of claim 1, wherein the composition comprises:
   copper in an amount of from about 1 to about 6 wt % of the catalytic composition;
   Mn in an amount of about 10 to about 70 $g/ft^3$; and
   Ce in an amount of about 80 to about 140 $g/ft^3$.

10. A catalyst article for an exhaust gas system, the catalyst article comprising the catalytic composition of claim 1 and a substrate.

11. An exhaust gas system comprising the catalyst article of claim 10 and a combustion engine.

* * * * *